US008170985B2

(12) United States Patent
Zimran et al.

(10) Patent No.: US 8,170,985 B2
(45) Date of Patent: May 1, 2012

(54) PRIMARY STUB FILE RETENTION AND SECONDARY RETENTION COORDINATION IN A HIERARCHICAL STORAGE SYSTEM

(75) Inventors: Eyal Zimran, Richmond (GB); Christian J. Chuba, Berkeley Heights, NJ (US); Christopher H. Stacey, Swindon (GB); Mary Walker, Windham, NH (US)

(73) Assignee: EMC Corporation, Hopkinton, MA (US)

( * ) Notice: Subject to any disclaimer, the term of this patent is extended or adjusted under 35 U.S.C. 154(b) by 1485 days.

(21) Appl. No.: 11/343,313

(22) Filed: Jan. 31, 2006

(65) Prior Publication Data

US 2007/0179990 A1 Aug. 2, 2007

(51) Int. Cl.
*G06F 17/00* (2006.01)

(52) U.S. Cl. ........ 707/609; 707/661; 707/640; 707/682; 707/821; 707/826

(58) Field of Classification Search .................. 707/609, 707/661, 640, 682, 821, 826
See application file for complete search history.

(56) References Cited

U.S. PATENT DOCUMENTS

| | | | |
|---|---|---|---|
| 5,596,706 A | 1/1997 | Shimazaki et al. | |
| 5,835,954 A | 11/1998 | Duyanovich et al. | |
| 5,893,140 A | 4/1999 | Vahalia et al. | |
| 5,901,327 A | 5/1999 | Ofek | |
| 5,963,962 A | 10/1999 | Hitz et al. | |
| 5,974,563 A | 10/1999 | Beeler, Jr. | |
| 6,023,709 A * | 2/2000 | Anglin et al. | ........... 707/204 |
| 6,078,929 A | 6/2000 | Rao | |
| 6,185,661 B1 | 2/2001 | Ofek et al. | |
| 6,269,431 B1 | 7/2001 | Dunham | |
| 6,490,666 B1 | 12/2002 | Cabrera et al. | |
| 6,665,689 B2 | 12/2003 | Muhlestein | |
| 6,757,794 B2 * | 6/2004 | Cabrera et al. | ........... 711/156 |
| 6,804,719 B1 * | 10/2004 | Cabrera et al. | ........... 709/226 |
| 6,938,039 B1 * | 8/2005 | Bober et al. | ........... 707/8 |
| 2006/0010150 A1 * | 1/2006 | Shaath et al. | ........... 707/102 |
| 2006/0123232 A1 * | 6/2006 | Cannon et al. | ........... 713/165 |
| 2006/0212481 A1 | 9/2006 | Stacey et al. | |
| 2006/0212746 A1 | 9/2006 | Amegadzie et al. | |

(Continued)

OTHER PUBLICATIONS

Charles King, "A WORM Turn: EMC Introduces Centera Compliance Edition," Excerpt from Market Roundup, Apr. 11, 2003, The Sageza Group, Mountain View, CA, one page.

(Continued)

*Primary Examiner* — Shahid Alam
*Assistant Examiner* — Andalib Lodhi
(74) *Attorney, Agent, or Firm* — Richard Auchterlonie; Novak Druce & Quigg, LLP

(57) ABSTRACT

A protected file is retained in secondary storage for a retention period, and a corresponding stub file is retained in primary storage for the retention period. The stub file retains attributes of the file indicating a location of the file data in the secondary storage and indicting that the stub file is to be retained for the retention period. A system administrator may instruct a primary file server that a secondary file server supports retention based protection and it is desired to protect stub files corresponding to protected files that are migrated to the secondary file server. The primary file server may request the secondary file server to return a protection status of the file after migration. This enables automatic policy-based migration to both file level retention (FLR) and non-FLR retention protected secondary storage from diverse applications accessing FLR or non-FLR files in the primary storage.

20 Claims, 11 Drawing Sheets

U.S. PATENT DOCUMENTS

2007/0106710 A1* 5/2007 Haustein et al. .............. 707/204

OTHER PUBLICATIONS

Henry Baltazar, "SnapLock Locks Down Info," eWeek.com, Oct. 20, 2003, Ziff Davis Internet, Woburn, MA, 4 pages.

"SnapLock (TM) Compliance and SnapLock Enterprise Software," Network Appliance, Inc., Sunnyvale, CA, 2003, 2 pages.

"Information Lifecycle Management: An Automated Approach," Technical White Paper, EMC Corporation, Hopkinton, MA, Dec. 8, 2003, 20 pages.

"EMC Centera Partner Solutions, EMC-LEGATO E-mail Archiving Solution," EMC Corporation, Hopkinton, MA, Jul. 2004, 4 pages.

"CFA: File System Archiving with Centera," TANEJA Group, Inc., Hopkinton, MA, May 2005, 7 pages.

"EMC Celerra FileMover Functionality," EMC Corporation, Hopkinton, MA, Jul. 2005, 4 pages.

"EMC Centera FileArchiver," EMC Corporation, Hopkinton, MA, Aug. 2005, 4 pages.

"EMC Centera FileArchiver," emc.com, EMC Corporation, Hopkinton, MA, printed Oct. 27, 2005, 2 pages.

"SnapLock (TM) Compliance and SnapLock Enterprise Software," netapp.com, Network Appliance, Inc., Sunnyvale, CA, printed Dec. 15, 2005, 3 pages.

EMC Celerra SE5 File Server, EMC Corporation, Hopkinton, Mass. 01748-9103, Feb. 2002, 2 pages.

"Celerra File Server in the E-Infrostructure," EMC Corporation, Hopkinton, Mass., 2000, 12 pages.

"Celerra File Server Architecture for High Availability," EMC Corporation, Hopkinton, Mass., Aug. 1999, 11 pages.

"Network Data Management Protocol (NDMP)," ndmp.org; NDMP White Paper, "Protocol Specification Summary, Document Version: 1.7.2S," ndmp.org; "Legato Systems Embraces the NDMP Standard: Legato Networker Software to be NDMP Compliant in Q3," legata.com; published at least as early as Oct. 11, 1999, 17 pages.

R. Stager and D. Hitz, Internet Draft filename "draft-stager-iquard-netapp-backup-05.txt," Network Data Management Protocol (NDMP), last update Oct. 12, 1999, 73 pages.

"Remote Mirroring Technical White Paper," Copyright 1994-2002 Sun Microsystems, Santa Clara, CA, published at least as early as May 17, 2002 at sun.com, 25 pages.

"EMC TechNote: Celerra Replicator," EMC Corporation, Hopkinton, MA, 2002, 5 pages.

"VERITAS Volume Replication and Oracle Databases," A Solutions White Paper, Veritas Software Corporation, Mountain View, CA, May 29, 2000, 31 pages.

"EMC Symmetrix Data Migration Services," EMC Corporation, Hopkinton, MA, Jul. 2001, 4 pages.

"Global Recovery Demonstration: SRDF/A and Primecluster," EMC Corporation, Hopkinton, MA, Feb. 2004, 27 pages.

"EMC Open Replicator for Symmetrix," EMC Corporation, Hopkinton, MA, Jan. 2005, 12 pages.

John Phillips, "Storage Consolidation and Data Protection using MultiStoreTM," Network Appliance, Inc., Sunnyvale, CA, Feb. 18, 2003, 13 pages.

"Celerra Data Migration Service (CDMS)," EMC Corporation, Hopkinton, MA, Jan. 2002, 14 pages.

"EMC Centera Solutions, EMC Avalon-Centera Single Point of Access Solution," EMC Corporation, Hopkinton, MA, Oct. 2002, 4 pages.

Technology Brief—Aug. 2002, "Automated Resource Management," The Enterprise Storage Group, Milford, MA, Aug. 2002, 3 pages.

"Oracle9i with Celerra File Server over NFS," EMC Corporation, Hopkinton, MA, Nov. 22, 2002, 15 pages.

Nancy Marrone, Product Brief—Apr. 2003, "Astrum's Active Storage Management Solution Key to EMC's Mid-Tier Software Offering," The Enterprise Storage Group, Milford, MA, Apr. 2003, 2 pages.

Data Sheet, "EMC AVALONidm, Intelligent data management to lower total cost of storage," EMC Corporation, Hopkinton, MA, Jul. 2003, 4 pages.

Jamie Gruener et al., "Digital Content and Storage Management in the Media and Entertainment Industry," The Yankee Group, Boston, MA, Nov. 2003, 16 pages.

On Life in Information, vol. 1, 2004, Doing More with Storage, EMC Corporation, Hopkinton, MA, Mar. 2004, 32 pages.

"Information Lifecycle Management Updates," EMC Corporation, Hopkinton, MA, Oct. 2004, 2 pages.

"EMC: Information Lifecycle Management: Real Results for Business Realities," EMC Corporation, Hopkinton, MA, http://www.emc.com/ilm/ilm_update, printed Jan. 26, 2005, 4 pages.

"OLE Component Object Model," Object Services and Consulting, Inc., Dallas, Texas, objs.com, printed Mar. 14, 2005, 7 pages.

Uresh Vahalia, Unix Internals: The New Frontiers, Chapter 9, "File System Implementations," Prentice-Hall, Inc., New Jersey, 1996, p. 261-289.

* cited by examiner

PRIMARY STUB FILE RETENTION AND SECONDARY RETENTION COORDINATION IN A HIERARCHICAL STORAGE SYSTEM

FIELD OF THE INVENTION

The present invention relates generally to a data network including computer data storage, and more particularly to hierarchical storage management in such a data network.

BACKGROUND OF THE INVENTION

Files are also often moved between file servers in order to relocate infrequently accessed files from feature-rich, expensive, and highly-protected high-speed disk storage to more economical and possibly slower mass storage. In such a hierarchical storage system, the high-speed disk storage is referred to as primary storage, and the mass storage is referred to as secondary storage. When a file is moved from a primary file server to a secondary file server, the file in the primary file server is typically replaced with a corresponding stub file that contains attributes of the file including a link to the new file location in the secondary file server. The stub file can be accessed to redirect an access request from a client to the new file location in the secondary server, or to migrate data from the file location in the secondary server back to the primary file server. The migration can be performed in accordance with a selected service level policy, for example, as described in "Information Lifecycle Management: an Automated Approach," Technical White Paper, EMC Corporation, Hopkinton, Mass., Dec. 8, 2003.

For applications that must comply with certain regulatory requirements, a file server may ensure content authenticity and retention of data for a certain period of time. Such regulatory requirements include Securities Exchange Commission (SEC) Rule 17a-4, stock exchange (NASD/NYSE) supervision requirements, and the Sarbanes-Oxley Act. For example, data have been written to CD-R optical disks to ensure content authenticity and retention of the data.

More recently, a file server using a redundant array of inexpensive magnetic disks (RAID) has been configured for ensuring content and ensuring Write Once Read Many (WORM) semantics. For example, a Centera (Trademark) brand of magnetic disk-based WORM device has been offered by EMC Corporation in connection with a policy engine for automatically moving reference data from primary storage to the WORM device. As described in "EMC-LEGATO E-mail Archiving Solution," Solution Sheet, EMC Corporation, Hopkinton, Mass., July 2004, the Centera (Trademark) brand of magnetic disk-based WORM device has been used for retaining e-mail for a set period of time and also making the e-mail instantly accessible.

Another method of file retention protection is known as file level retention (FLR). Typically FLR uses a volume or file system attribute for indicating retention period protection in connection with file attributes such as a "read-only" flag and the "last accessed" attribute. If the volume or file system attribute is set, then the setting of the "read-only" flag for a file in the protected volume or file system gives the file and its pathname WORM properties. Once the "last accessed" attribute for such a protected file is set with a retention date, the file cannot be altered or deleted until after the retention date. See, for example, Henry Baltazar, "SnapLock Locks Down Info," eWeek.com, Woburn, Mass., Oct. 30, 2003.

SUMMARY OF THE INVENTION

In a hierarchical storage system having secondary storage retaining a protected file for a certain retention period, it is desirable to protect a corresponding stub file for the retention period in primary storage and to coordinate the retention protection capability of the primary and secondary storage.

In accordance with one aspect, the invention provides a computer-implemented method of operating a primary file server and a secondary file server in a data network. The method includes the primary file server replacing a file in primary storage of the primary file server with a corresponding stub file in the primary storage when data of the file are migrated from the primary storage to secondary storage of the secondary file server. The corresponding stub file retains attributes of the file including an indication of a location of the file data in the secondary storage. The method further includes the secondary file server setting a retention period for the file data in the secondary storage, and the secondary file server retaining the file data in the secondary storage for the retention period. The primary file server sets at least one attribute of the corresponding stub file to indicate that the corresponding stub file is to be retained for the retention period, and the primary file server accesses the at least one attribute of the corresponding stub file to reject a request from a client or user to change the file prior to expiration of the retention period.

In accordance with another aspect, the invention provides a primary file server for use in a data network coupling the primary file server to at least one secondary file server. The primary file server includes primary storage and is programmed for replacing a file in the primary storage with a corresponding stub file in the primary storage when data of the file are migrated from the primary storage to secondary storage of the secondary file server. The corresponding stub file stores attributes of the file including an indication of a location of the file data in the secondary storage. The primary file server is programmed for setting at least one attribute of the corresponding stub file to indicate that the corresponding stub file is to be retained for a retention period when the secondary file server supports retention protection of the migrated file data and the secondary file server has been set to retain the migrated file data for the retention period. The primary file server is also programmed for accessing the at least one attribute of the corresponding stub file to reject a request from a client or user to change the file prior to expiration of the retention period.

In accordance with yet another aspect, the invention provides a system including a primary file server, a file level retention (FLR) secondary file server, a non-FLR write once read many (WORM) secondary file server, and a data network interconnecting the primary file server to the FLR secondary file server and the WORM secondary file server for migration of file data from the primary file server to the FLR secondary file server and from the primary file server to the WORM secondary file server. The primary file server is programmed for migrating data of FLR files and data of non-FLR files to the FLR secondary file server, and for migrating data of FLR files and data of non-FLR files to the WORM secondary file server. The primary file server is programmed for replacing a specified file in the primary file server with a corresponding stub file in the primary file server when data of a specified file have been migrated from the primary file server to a selected one of the FLR secondary file server and the WORM secondary file server. The corresponding stub file contains attributes of the file including an indication of a location of the file data in the selected one of the FLR secondary file server and the WORM secondary file server. The primary file server is also programmed for setting at least one attribute of the corresponding stub file to indicate that the corresponding stub file is to be retained for a retention period of the data of the specified file on the selected one of the FLR secondary file server and the WORM secondary file server. The primary file server is further programmed for accessing the at least one attribute of the corresponding stub file to reject a request from a client or user to change the specified file prior to expiration of the retention period.

BRIEF DESCRIPTION OF THE DRAWINGS

Additional features and advantages of the invention will be described below with reference to the drawings, in which.

Figure 1:
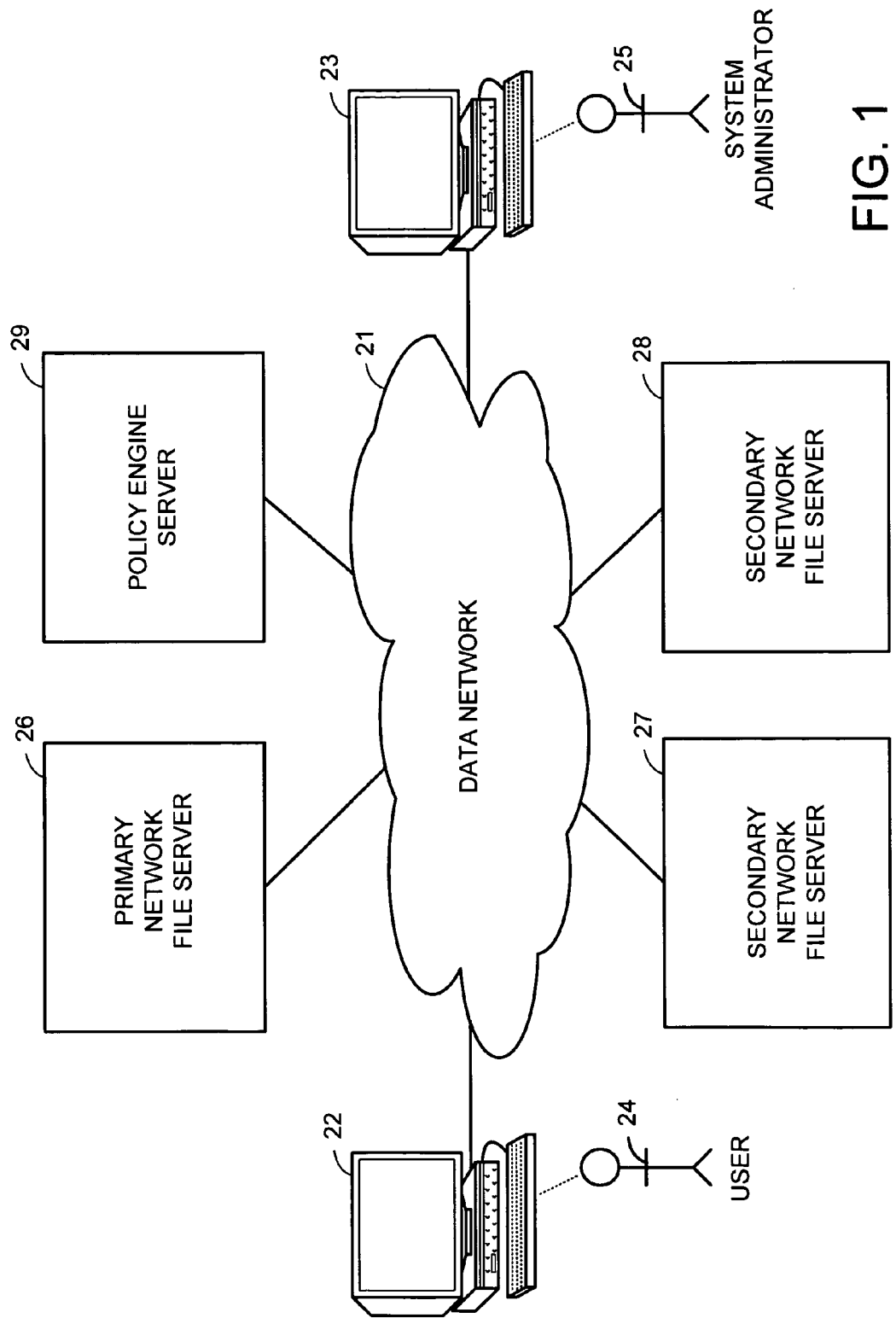
FIG. 1 is a block diagram of a data network including file servers for serving client workstations operated by respective users, and a policy engine server for initiating migration of file data from a primary file server to at least one secondary file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

Operation of a Hierarchical Storage System

With reference to FIG. 1, there is shown a data processing system including a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers operated by human users 24, 25. The servers include a primary network file server 26, secondary network file servers 27 and 28, and a policy engine server 29.

The primary network file server 26, for example, is a cached disk array as described in Vahalia et al., U.S. Pat. No. 5,893,140 issued Apr. 6, 1999, incorporated herein by reference. Such a cached disk array 26 is manufactured and sold by EMC Corporation, 176 South Street, Hopkinton, Mass. 01748. The secondary network file serves 27 and 28, for example, are similar to the primary network file server 26 except that they have a relatively small amount of cache memory, and a relatively large array of relatively slow, high-capacity disk drives, such as ATA disk drives.

The primary network file server 26 is programmed to respond to a command for migrating the data of a specified file from the primary file server to a specified secondary network file server while retaining metadata for the file in the primary file server. The metadata for the file includes the typical file attributes and also additional offline attributes including a complete network pathname to the specified secondary file server and the file data in the specified secondary file server. Once the file data have been migrated, the file is said to be "offline." The primary file server is also programmed to access the file data of offline files in various ways in response to client requests for read or write access to the offline files. In a preferred implementation, the secondary file servers are configured to disallow the clients from directly accessing the file data that have been migrated from the primary file server. Also, in the preferred implementation, the primary file server is configured to disallow the migration of data from directories so that directories are not permitted to be offline files. However, in an alternative implementation, the primary file server could be configured to allow migration of data from directories so that directories could be permitted to be offline files.

The data processing system in FIG. 1 includes a policy engine server 29 that decides when a file in the primary network file server should become offline. The policy engine server 29 is activated at scheduled times, or it may respond to events generated by specific file type, size, owner, or a need for free storage capacity in the primary network file server. Migration may be triggered by these events, or by any other logic. When free storage capacity is needed in the primary network file server, the policy engine server 29 scans file attributes in the primary file server in order to identify online files and to select an online file to become offline. The policy engine server 29 may then select a secondary network file server to become the secondary storage for the data of the selected online file, and send a migration command to the primary network file server specifying the selected online file and the selected secondary network file server. In a preferred implementation, however, the policy engine server 29 in not involved in any decision to restore an offline file to online status. Once data of a file have been migrated to secondary storage and the offline attributes of the file have been set to indicate that the file is offline, the policy engine server can be shut down without affecting in any way the recall of the file data from secondary storage.

Figure 2:
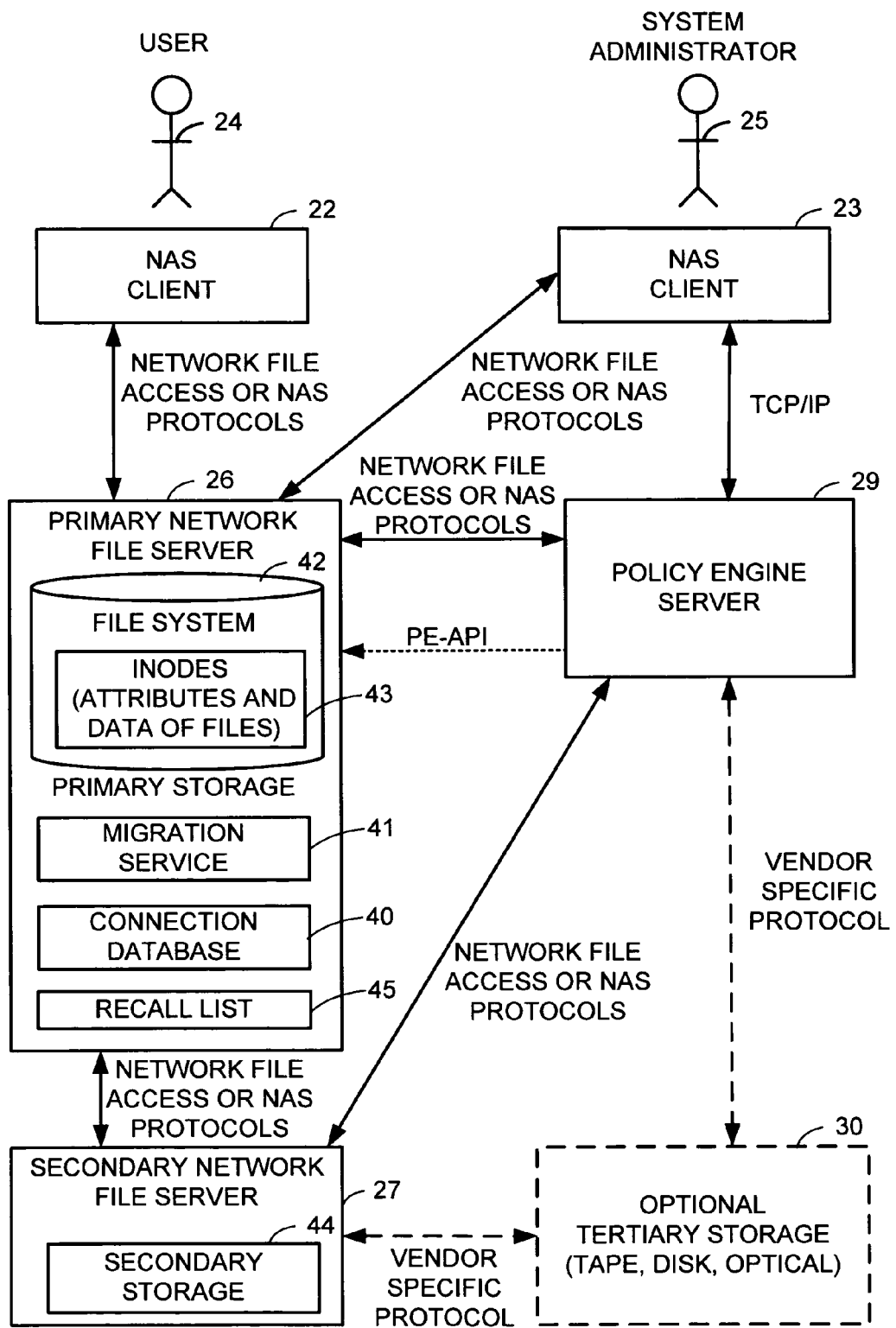
FIG. 2 is a diagram of data and control flow between the clients and servers in the data network of FIG. 1.

FIG. 2 shows the preferred flow of data and control between the clients and servers in the data network of FIG. 1. The network attached storage (NAS) clients 22, 23 use network file access or NAS protocols for access to the primary network file server 26. Such protocols include the network file system (NFS) protocol, the common internet file system (CIFS) protocol, and other data transfer protocols (HTTP, FTP, etc.). The NAS client 23 uses the TCP/IP protocol for accessing the policy engine server 29, and the system administrator 25 sets policy rules in the policy engine server. The policy engine server 29 uses network file access or NAS protocols for accessing attributes of files in the primary network file server 26 and in the secondary network file server 27. The policy engine server 29 sends a policy engine application interface (PEAPI) command to the primary network file server 26 in order to initiate migration from the primary network file server 26 to the secondary network file server 27.

The primary network file server 26 and the secondary network file server 27 also use network file access or NAS protocols for migrating data from the primary network file server to the secondary network file server, and for the recall of data from the secondary network file server to the primary network file server. For example, in order to migrate file data from the primary network file server to the secondary network file server, a NFS or CIFS connection is set up between the primary network file server and the secondary network file server.

In a preferred implementation, the primary network file server has a connection database 40 for each file system 42 stored in the primary network file server. For example, the connection database for the preferred implementation includes the following fields: for CIFS, the Server Name, Share name, User name, Password, Domain Server, and WINS server; and for NFS, the Server name, Path of exported share, Use Root credential flag, Transport protocol, Secondary server NFS/Mount port, Mount protocol version, and Local port to make connection. For both types of connections, the connection database also includes a field for storing a specification of a migration method override. Using the connection database avoids storing all the credential information in the offline inode, and ensures that the connection information will survive a re-boot of the primary network file server.

A file is defined by one of the inodes 43 in the file system 42. Prior to migrating data during the change of the state of a file from online to offline, the file is associated with such a connection defined in the connection database 40 for the file system 42 containing the file. This is done by setting an offline attribute of the file with a connection ID that is an index or pointer to an entry for the connection in the connection database 40 for the file system 42.

The secondary file server 27 should enable writes by the policy engine server 29 during migration from the primary storage to the secondary storage 44. However, the secondary store file should not be modified after the initial data migration to secondary storage by the policy engine. This would cause I/O errors when reading offline data from the primary storage 44 since the modification time and size attributes of the primary store file are checked for consistency against the modification time and size attributes of the secondary store file when the primary storage system recalls offline file data from the secondary storage. Also reads from offline files on snapshots and backups would be inconsistent if the file on the secondary storage would be modified.

Virus checking programs should not update files on the secondary file server 27, because this may cause data inconsistency of files that correspond to offline inodes on the primary store. No secondary store file should be modified after the initial creation, so viruses should not be found on a secondary store file unless they existed on the corresponding original file in the primary file server. If a virus is introduced into a secondary store file after migration from primary to secondary storage, data migration from secondary to primary storage during recall will fail if the modification time/size of the offline inode is out-of-sync with the secondary store file.

If using NFS or CIFS, the secondary file server should allow connection by the file's owner from the primary file server, unless the connection associated with the file specifies root credentials. If the connection specifies root credentials, then the secondary file server should permit root access from the primary file server.

As further shown in FIG. 2, the data network may include optional tertiary storage 30 such as tape, disk, or optical storage. Such tertiary storage would use proprietary vendor specific protocols for transfer of data between the secondary network file server 27 and the tertiary storage, and for access of the policy engine server to the tertiary storage.

In a preferred implementation, a file migration service 41 is used to copy a specified file from the primary network file server 26 to a new corresponding file on a secondary network file server. Then the online inode of the specified file in the primary network file server is converted to an offline inode in the primary network file server. The offline inode specifies a full absolute network pathname to the corresponding file in the secondary storage. Then all of the data blocks for the file in the primary network file server are freed.

When a client requests the primary file server for write access to a file, the write operation will fail if there is not enough free space for the file system on the primary file server or if the file system is read-only. If the file's inode is already online, writes proceed as usual. Otherwise, the file is brought online by a full migration of the file data from the secondary file server storing the data of the file to the primary file server. (Other policies for writing to an offline file are possible, such as writethrough. Such other policies may require complex coordination with other primary server functions.) For example, the full migration of the file data includes creating a migration inode and allocating file system data blocks, reading the file data from the secondary file server and writing the file data to the allocated file system data blocks and updating the migration inode. Once all of the file data have been migrated, the file is made online by converting the migration inode to an online inode, substituting the online inode for the offline inode for the file, and then de-allocating the offline inode for the file. The copy of the file in the secondary storage should not be deleted unless there is no snapshot or backup that refers to it. Once the file becomes online in the primary data storage system, the primary file server accesses the online file in the usual fashion.

When a client requests the primary file server for read access to a file, the read operation proceeds as usual if the inode is online. Otherwise, a particular one of a number of predefined methods for read access to an offline file is selected for accessing the file data from the secondary file server that stores the file data for the file. The predefined methods for read access to an offline file include a full read migration, a partial read migration, and a pass-through read of the file data. If there is insufficient free storage on the primary file server to support a full or partial read migration, then the pass-through method is selected. The pass-through method is also used for accessing a file in a file system that is mounted as read-only.

In a full read migration, the file is brought online by a full migration of the file data from the secondary file server storing the data of the file to the primary file server. Then the client accesses the online file in the usual fashion.

In a pass-through read of the file data, the primary file server reads the file data requested by the client from the secondary file server and returns the requested file data to the client, without creating a migration inode or allocating file system blocks for storage of the file data in the primary file server.

In a partial read migration, the client requests a read of specific file data. The primary file server responds by partial migration of file system data blocks including at least the specific file data. The file server may also migrate a certain number of additional file system data blocks following the last file system data block containing the specific file data, such as 128 additional file system data blocks. If all of the file system data blocks of the file happen to be migrated, the offline file can be made online. Otherwise, the migration inode becomes substituted for the offline inode. The offline attributes, however, indicate that the primary file server stores a partially migrated file. The client is given read access to the file as soon as the requested file data are recalled, unlike the usual fashion where the client will not get any data until the entire file is recalled. This advantage is particularly important for large files, thus making response time to a client or application much quicker.

In one preferred implementation, a partially migrated file always contains online file data (i.e., file data stored in primary storage of the primary file server) up to a certain maximum offset "y" that is less than the extent of the file. The maximum offset "y" is an offline attribute of the file. The primary file server responds to a client read request for data up to a specified offset "z" in the partially migrated offline file by checking whether the specified offset "z" is greater than the maximum offset "y", and if so, performing a partial read migration of additional file system data blocks file up to and including the file system data block containing the data for the specified offset "z" (and a certain number of additional file system data blocks), and if not, by accessing the file data in the primary file server in the usual fashion.

The primary file server may respond to a client request to truncate a partially migrated offline file at a specified offset "w" by checking whether the specified offset "w" is greater than the maximum offset "y", and if so, performing a partial read migration of additional file system data blocks up to and including the file system data block containing the data for the specified offset "w". Once the specified offset "w" is greater than the maximum offset "y", the file extent is set to "w", any file system blocks beginning after specified offset "w" are freed, and the offline file is made online. The copy of the file may then be deleted from the secondary file server.

Further details regarding the operation of the hierarchical storage system in FIGS. 1 and 2 are found in Augustine Amegadzie, et al., U.S. patent application Ser. No. 11/085, 898 filed Mar. 21, 2005, entitled. "Selection of Migration Methods Including Partial Read Restore in Distributed Storage Management," incorporated herein by reference.

Retention Protection of Stub Files

For applications that must comply with certain regulatory requirements, a file server may ensure content authenticity and retention of data for a certain period of time. As introduced above, file servers have provided retention protection such that when a file is written to storage, the file will not later be changed (e.g., written, deleted, moved, etc.) prior to expiration of a certain retention period in the future.

File servers basically have used one of two techniques for providing retention protection of files. One technique is known as file level retention (FLR), and the other technique is known as a WORM file system. It is possible that a single file server could use both techniques; for example, the FLR technique could be used on one file system on one volume in the file server, and the WORM technique could be used on another file system on another volume in the file server. In practice, however, it has been more common for a single file server to use only one of the two techniques. For example, the WORM technique has been commonly used on HTTP servers dedicated to protected archival storage (such as the EMC Corporation Centera (Trademark) brand of magnetic disk-based WORM storage introduced above), and the FLR technique has been used on NFS/CIFS network servers that are not necessarily dedicated to protected archival storage.

Figure 3:
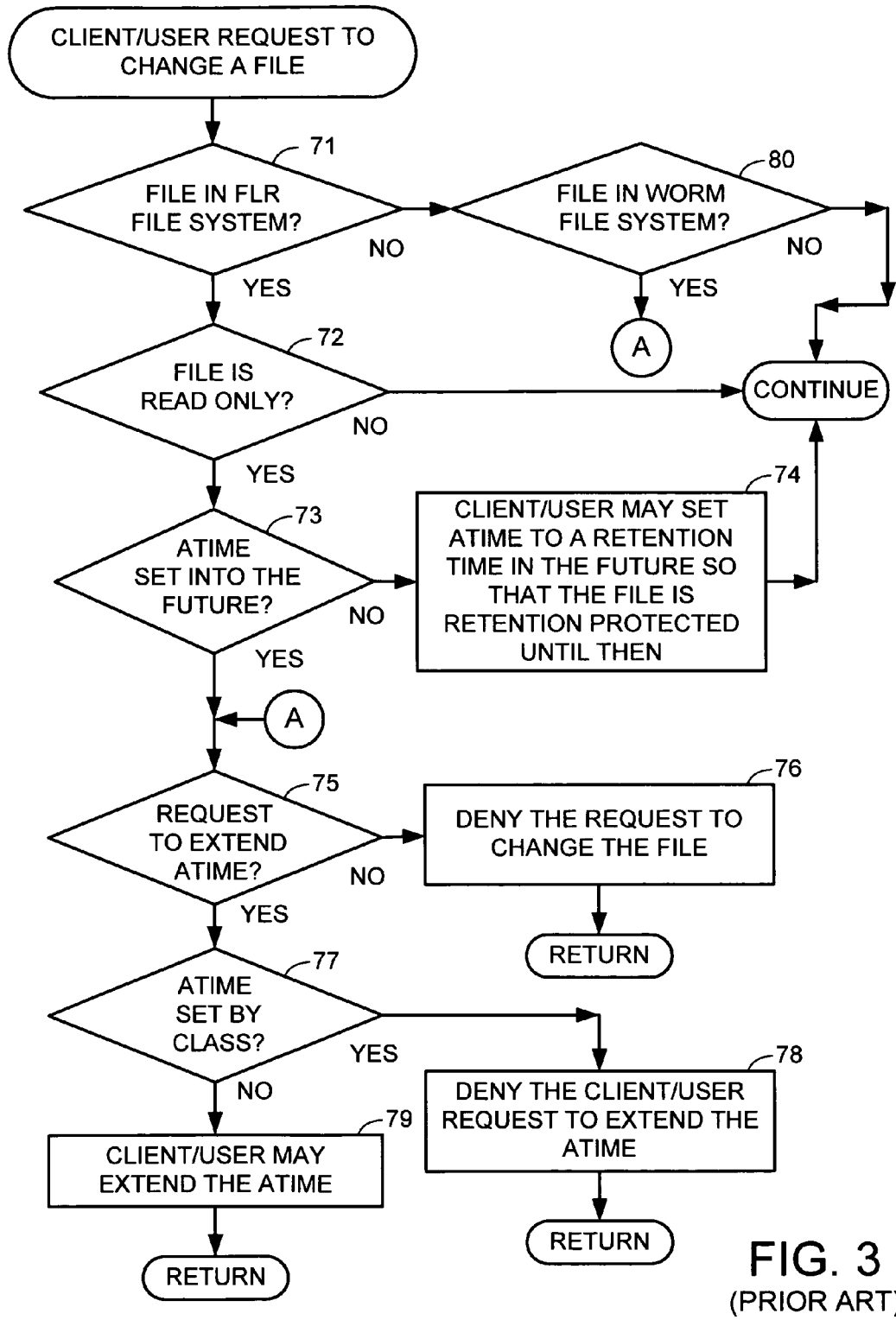
FIG. 3 is a flowchart showing how a file server has responded to a request from a client or user to change a retention protected file.

FIG. 3 shows a how a network file server using the FLR or WORM technique responds to a client or user request to change a file. In step 71, if the file is in a FLR file system (e.g., a file system having a "FLR" attribute set), then execution continues to step 72. In step 72, if the file is not read only (e.g., the file does not have a "read only" attribute set), then client or user access to the file continues in the usual fashion, since the file is not retention protected. In step 72, if the file is read-only, then execution continues to step 73. In step 73, if the last accessed time ("atime") of the file is not set in the future, then execution branches to step 74. In step 74, the client or user may set the "atime" attribute of the file to a time in the future so that the file is retention protected until then.

In step 73, if the "atime" attribute of the file is set in the future, then execution continues to step 75. In step 75, if the client or user request to change the file is not simply a request to extend the "atime" attribute to a time further in the future, then execution branches to step 76 to deny the request to change the file.

In step 77, if the "atime" attribute is set by class, then execution continues to step 78 to deny the client or user request to extend the "atime" attribute. In this case, a normal client or user does not have authority to change the "atime" attribute, but the "atime" attribute could be increased or decreased for the class by an authorized administrator of the server. The class, for example, is the entire file system or a particular sub-directory in the file system, so that the file inherits the "atime" of a predecessor directory. In step 77, if the "atime" attribute is not set by class, then execution continues to step 79. In step 79, the client or user may extend the "atime" attribute to some time further in the future.

In step 71, if the file is not in a FLR file system, then execution continues to step 80. In step 80, if the file is in a WORM file system, then execution continues to step 75. In step 80, if the file is not in a WORM file system, then access to the file continues in the usual fashion.

Figure 4:
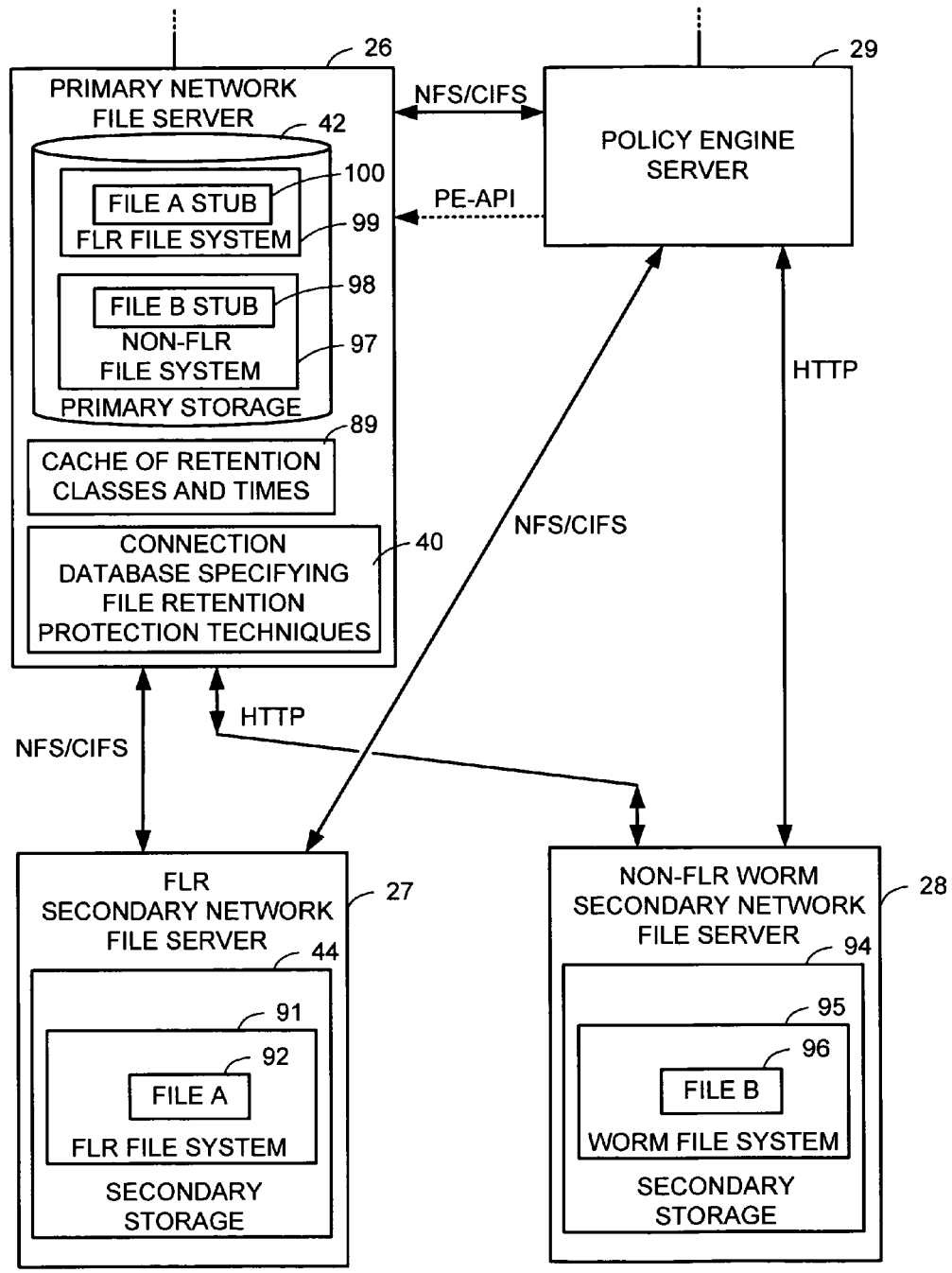
FIG. 4 is a diagram showing a way to use the data network of FIG. 1 for providing retention coordination between the primary network file server and two secondary network file servers providing different kinds of retention protection of files in secondary storage.

As shown in FIG. 4, the secondary network file server 27 of the hierarchical storage system of FIG. 2 can be programmed to provide a FLR file system 91 for retention protection of a file 92 that has been migrated from the primary network file server 26. In addition, the secondary network file server 28 is a non-FLR WORM storage device linked (in the data network 21 of FIG. 1) to the primary network file server 26 and the policy engine server 29 for transmission of file data and HTTP messages. The WORM secondary network file server 28 includes secondary storage 94 including a WORM file system 95.

The non-FLR WORM secondary network file server 28 is programmed to apply retention protection to a file 96 when the file is migrated from the primary network file server 26. For example, the WORM secondary file server 28 is a Centera (Trademark) brand of magnetic disk-based WORM device offered by EMC Corporation. In this case, it is desirable also to apply retention protection to the corresponding stub file 98 when the primary network file server 26 converts the online file in the primary storage 42 to the stub file 98. For example, the policy engine server 29 applies the same period of protection to the stub file that replaces a migrated online file as it applies to the migrated file's content on the secondary storage 94, but this does not need to be the case.

A system administrator wishing to enable stub file retention protection may enable it on a per file system or per secondary storage location basis, and use a policy engine server 29 that supports this functionality. Through an application program interface (API), the policy engine server 29 sets a file attribute indicating that the stub file 98 in the primary storage 42 is under retention control. The policy engine server 29 also specifies the client and application or process which has requested the retention on the stub file. A policy engine that supports stub file retention may also change the retention period as desired, and thus it would be responsible for extending or reducing the retention period. The primary network file server 26 logs all requests to set or change a retention period on a stub file. The primary network file server 26 enforces stub file retention by denying any request to change or remove the stub file by a standard CIFS/NFS/HTTP client access prior to expiration of the retention period. Only an authorized policy engine server would allow changes or removal of protection through an API request to the primary network file server 26.

For example, the policy engine 29 that supports stub file retention sends an API request to the primary network file server 26 for setting the retention period and protection attributes, including the requester, of the stub file. For example, the primary network file server sets the retention period for the stub file by setting the "last access timestamp" (atime) attribute of a stub file 98 into the future and setting the stub file to be read-only, and the primary network file server specifies the requester for this protection (for example by specifying an ID for the policy engine server).

One way of enforcing retention protection of the stub file 98 is for the primary network file server to apply the following file level retention (FLR) semantics to the stub file. A file system can be set to a FLR state. In such a FLR file system, any file set to be read-only is considered to be in a FLR protected state. Once in the FLR protected state, the primary network file server will reject any request from a client to modify or delete that file (or any directories that lead to the file) until the retention period associated with the file has expired. Once the retention period has expired, the file can be deleted but not modified. The retention period associated with a file is specified using the last access timestamp (atime) associated with the file. If the atime is set into the future, then the time it is set to is the end of the retention period. If the atime is not set into the future when the file is set to be read-only and hence into the FLR state then the retention period for that file is considered to be infinite. An infinite retention period can be reduced by setting the atime to a specific point in time. However, once the atime has been explicitly set it can only ever be increased.

Thus, by setting an option to enable FLR style protection of stub files, and setting the stub file 98 to read-only, the primary network file server 26 will then treat the stub file 98 as being in the FLR state and enforce FLR semantics on it (regardless of whether the stub file 98 is in a non-FLR file system 97). A stub file that is set read-only without the "atime" being set into the future results in a "soft" infinite retention period. FLR protection of stub files also implies synchronization of UNIX and DOS read-only attributes on the stub files.

The policy engine server 29 sends a "set offline" API call to the primary network file server 26 in order to set the "atime" of a stub file as part of the set offline process. That means that the policy engine server 29 would need to make only one additional call to each file to set it to be read-only. Alternatively the "set offline" API call could be enhanced to allow the policy engine server 26 to set the stub file 98 to be read-only as part of the set offline process, so that no additional API calls would be needed to enable stub file retention.

Coordinated Retention Protection of Stub Files

It is desired to ensure that the same retention protection that is enforced on the file's content on the secondary storage is also enforced on the corresponding stub file on the primary network file server. It is also desired to enable FLR file systems in the primary network file server to be migrated to the secondary storage without restriction or loss of protection. It is also desired to support the use of both explicit, per object, or class based retention protection of files migrated to the secondary storage. Moreover, when using a FLR file system as secondary storage, it is desired to ensure that the same retention protection that is enforced on the file's content on the secondary FLR file system is enforced on the corresponding stub file on the primary network file server.

There are a number of possible behavior scenarios for file retention coordination depending on whether or not a file to be migrated from the primary network file server is in a FLR file system in the primary storage and whether or not the file is to be retained in a FLR file system in the secondary network file server.

If a file is to be migrated from a non-FLR file system 97 on the primary storage 42 to a non-FLR file system 95 on the secondary storage 94, then the policy engine server 29 (as instructed by a particular migration software migration job) may define that an explicit retention period is applied to the file 96 when it lands on the secondary storage, or the policy engine server may define that the file is associated with a retention class when it lands on the secondary storage.

If a file is migrated from a FLR file system 99 on the primary storage to a non-FLR file system 95 on secondary storage 94, then a client or user may extend the retention period on the file in secondary storage. The policy engine server 29 may instruct the primary network file server 26 to copy the file from the primary storage 42 to the secondary storage 94 before the policy engine server instructs the primary network file server to set the file offline, or the policy engine server may instruct the primary network file server to copy the file itself and then set the file offline.

If a file is migrated from a non-FLR file system 97 on the primary storage 42 to a FLR file system 91 on secondary storage 44, then the policy engine (as instructed by a particular migration software migration job) defines that an explicit retention period is applied to the file when it lands on the secondary storage.

If a file is migrated from a FLR file system 99 on the primary storage to a FLR file system 91 on secondary storage 44, then a client or user may extend the retention period on the file 92 in the secondary storage.

There are a few scenarios that may occur regardless of type of secondary storage. First, a migrated file that is still under retention on the secondary storage could be read, and the migration read recall policy in effect could either be "full" or "partial". Second, an attempt could be made to force migration of a file that was set to FLR status on the primary storage to a secondary file system that is not marked as supporting retention period protection coordination. Third, a file not set to FLR status in the primary storage could be migrated and then later its corresponding stub file could be set to FLR status in the primary storage.

There are a number of assumptions for handling the behavior scenarios discussed above. First, for simplification of management, the secondary storage should be the final authority on the protection state of a migrated file.

Second, the retention protection associated with a file on the secondary storage can be set either explicitly, or inherited through association with a protection class defined on the secondary network file server. The retention time can only ever be increased for files that have had it set explicitly. The retention time of a class can be increased or decreased; hence the retention period for migrated file content associated with a class can decrease as well as increase.

Third, the primary network file server may cache, either temporarily or permanently, the retention period associated with a migrated file.

Fourth, to ensure that retention periods mean the same thing on both the primary network file server and the secondary network file server, the time should be synchronized between the primary network file server and the secondary file server.

Fifth, retention times on FLR file systems can only be extended (never reduced), with the exception of the "soft" infinite retention period.

Sixth, if a file has been made into a FLR file on the primary network file server (i.e., the client or user has applied retention protection via the primary network file server), then at least that level of protection should be maintained if the file is migrated to secondary storage.

Figure 5:
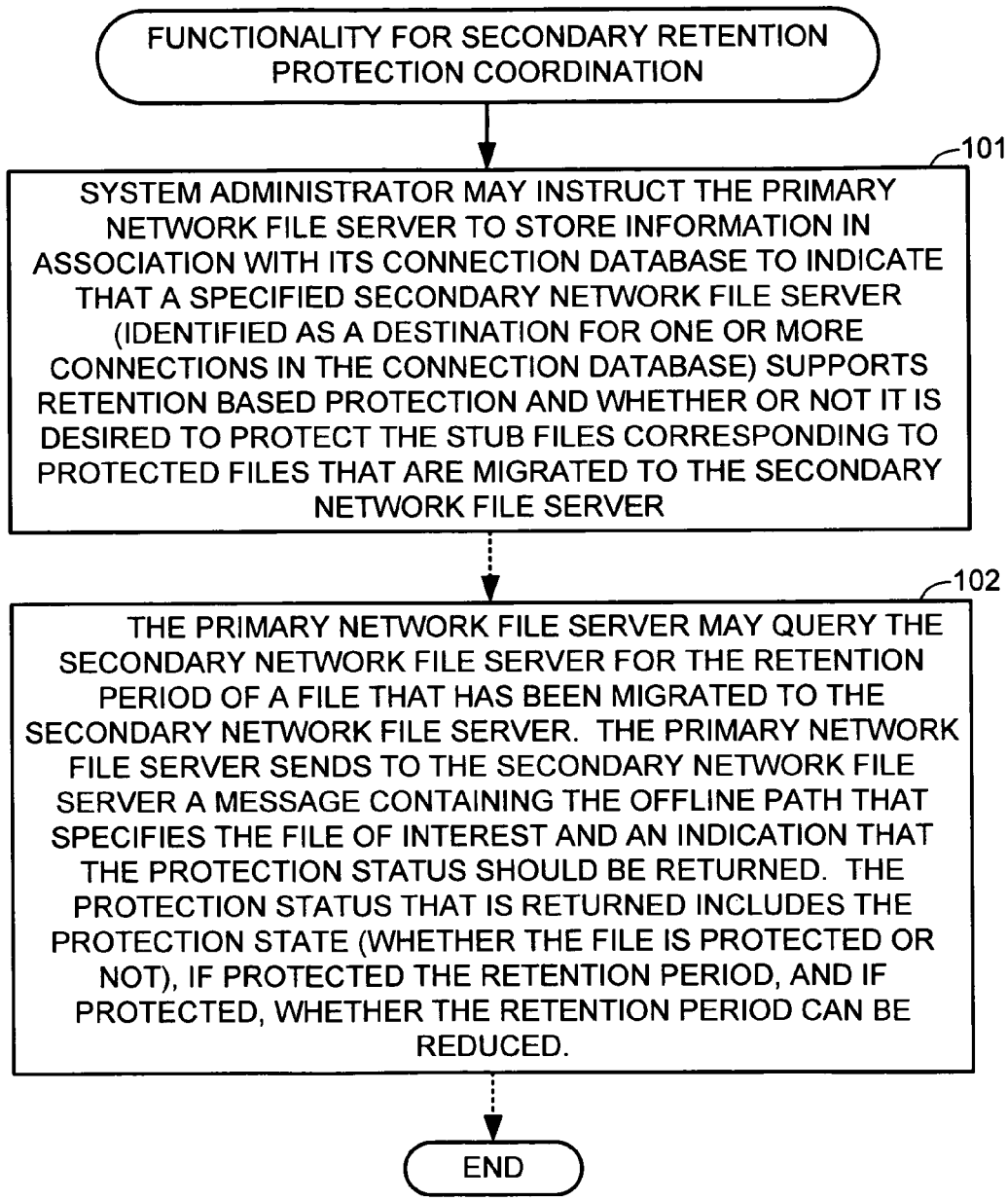
FIG. 5 is a flowchart showing use of functionality added to the primary and secondary network file servers in the data network of FIG. 1 in order to provide retention coordination in the data network of FIG. 4.

As shown in FIG. 5, the following functionality is added to the primary network file server for handling the behavior scenarios discussed above. A new option associated with the connection database (40 in FIG. 2) is provided to allow the system administrator (25 in FIG. 2) to inform the primary network file server that the secondary network file server supports retention based protection and it is also desired to protect the stub files corresponding to protected files that are migrated to the secondary network file server. For example, the setting of this option (in step 101 of FIG. 5) should appear in the output of the "get connection list" API call so that policy and migration applications can tell if they should take account of retention settings (read-only status and "atime") on files they are migrating.

A new option is provided for querying the retention period of a file that has been migrated to the secondary network file server (step 102 in FIG. 5). Whenever the primary network file server wishes to query the protection status of a file migrated to the secondary file server, it sends a message to the secondary network file server. This message contains the offline path that specifies the file that is of interest and an indication that the protection status information should be returned in response to the query rather than the file data. In response to such a query, the secondary network file server returns the following information: (1) Protection state: whether the file is protected or not; (2) If it is protected, then the retention period; and (3) If it is protected, whether or not the retention period can be reduced.

For example, the secondary network file server is a Centera (Trademark) brand of magnetic disk-based WORM device offered by EMC Corporation. In this case, the primary network file server sends an HTTP message to an HTTP server running on the secondary network file server. For example, the HTTP request has the following form:
    HTTP   GET   http://<address_of_secondary>/ retention?<content_reference>
where the <content_reference> is taken from the contents of the OFFLINE_PATH field of the stub file.

If a file that has been migrated to the secondary network file server is under retention via an explicit setting, then its retention period cannot be reduced, which means that the primary network file server can record the retention period in the inode of the corresponding stub file and need not check the file's status with the secondary network file server again until the retention period has expired.

If the file that has been migrated to the secondary network file server is under retention via a class, then its retention period can be reduced, which means that the primary network file server can cache the reported retention period only for some short time (less than the remaining retention period) before it needs to check again.

The primary network file server may set the retention on a file that has been migrated to the secondary network file server and is in a non-FLR secondary file system. For example, the primary network file server sends an HTTP message to an HTTP server on the secondary network file server. This message contains the offline path that specifies the file that is of interest and the new time to which the retention should be set to. If the current retention period of the file on the secondary network file server is already longer than the requested retention time then no error is returned. However, if the requested retention cannot be set on the secondary network file server, then an error should be returned. For example, if the file is not a FLR protected file on the primary network file server and the file is protected by class on the secondary network file server, then it would be best to fail a request from the primary network file server to set an explicit retention time, under the assumption that the secondary network file server should be the authority for the protection level of the file. If the file is a FLR protected file on the primary network file server and the file is also protected by class on the secondary network file server, then the request could be made to succeed by taking the file out-of-class on the secondary network file server and explicitly setting the retention time, under an assumption that for a FLR protected file, the primary network file server should be the authority for protection control.

The HTTP request for setting the retention time of a migrated file might take the following form:
HTTP GET http://<address_of_secondary>/ retention?<content_reference>&period=<time>
The <content_reference> is taken from the contents of the OFFLINE_PATH field of the stub file. This mechanism is not intended to allow the secondary network file server to alter the retention period associated with files that are protected via a class.

If the primary network file server wishes to set the retention on a migrated file on a FLR secondary file system, then it will "stat" the migrated file to determine if it is read-only and if it is what the current value of the last access time ("atime") for that file is. If a file is read-only and the atime is some time in the future then the file is protected. If the file is not read-only then it is not protected. If the file is read-only but the atime is in the past then the file is unprotected.

If a file is under retention and the period is set to less than infinite then the primary network file server can safely cache the retention period in the stub file inode. This is because explicit FLR retentions can only ever be extended. This means that the primary network file server can enforce the retention using the normal FLR functionality which means it does not have to query the secondary again until the retention period has expired.

If the primary network file server wishes to set the retention on a file on a FLR secondary file system it will set the "atime" of the file to the new retention period and if it is not already read-only set it so. The new retention setting can safely be cached in the stub file inode and enforced using the normal FLR functionality.

Following are more specific examples of the behavior scenarios. First, consider the following two cases of migration of a non-FLR file on the primary network file server to a non-FLR secondary network file server.

Figure 6:
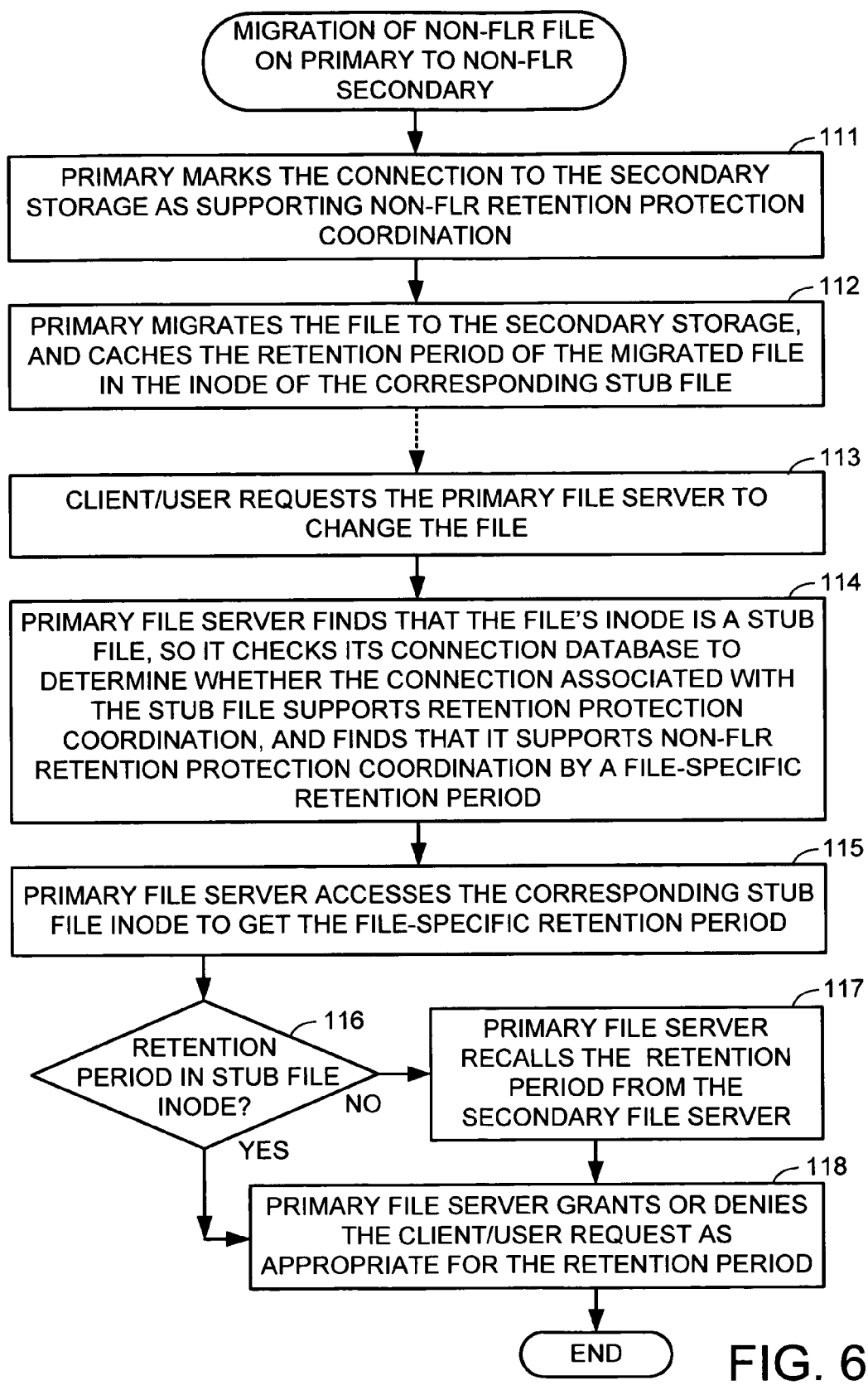
FIG. 6 is a flowchart showing migration of a non-FLR file on the primary network file server to the non-FLR secondary network file server in the data network of FIG. 4.

FIG. 6 shows the first case where the policy and migration software migration job defines that an explicit retention period is applied to the migrated file when it lands on the secondary storage. In a first step 111, the connection to the non-FLR secondary file server is marked as supporting retention protection coordination. In step 112, the primary network file server migrates the file to the secondary storage, and caches the retention period of the migrated file in the inode of the corresponding stub file. It does not matter whether the migration is done by the primary network file server writing out the file to the secondary network file server or by the secondary network file server fetching the file from the primary network file server, because the primary file server is not trying to apply any retention protection. In step 113, a client or user requests an action that would change the migrated file (write, delete, move, etc.). In response, in step 114, the primary network file server finds that the file's inode is a stub file, so it checks its connection database to determine whether the connection associated with the stub file supports retention protection coordination, and finds that it supports non-FLR retention protection coordination by a file-specific retention period. Thus, the primary network file server detects that the file has been migrated to a non-FLR secondary file server via a connection that has the retention protection coordination option enabled. In step 115, the primary network file server accesses the corresponding stub file inode to get the file-specific retention period from the "atime" attribute. In step 116, if the retention period is not cached in the "atime" attribute of the stub file attribute, then execution branches to step 117, and in step 117, the primary file server recalls the retention period from the secondary file server. The primary network file server may cache the recalled value of the retention period in the stub file inode. It then does not need to query the non-FLR secondary file server again until its cached retention period has expired to see if the retention period has been extended on the non-FLR secondary file server since the primary network file server last checked. Once the primary network file server gets the retention period from the "atime" attribute of the stub file or from the secondary file server, then execution continues to step 118. In step 118, the primary file server grants or denies the client or user request as appropriate for the file's retention period and the kind of user request, as described above with respect to steps 75 to 79 in FIG. 3.

Figure 7:
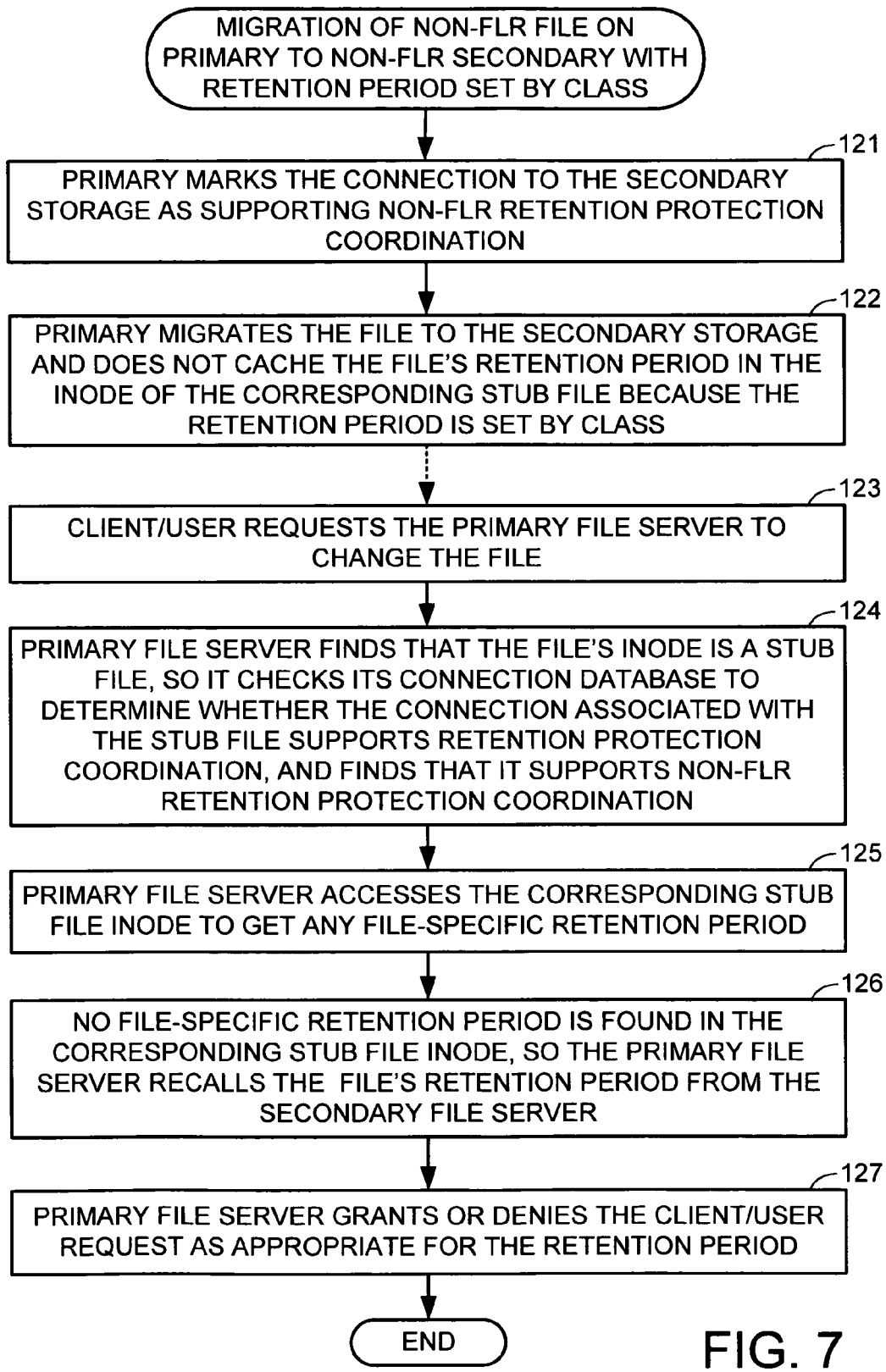
FIG. 7 is a flowchart showing migration of a non-FLR file on the primary network file server to the non-FLR secondary network file server in the data network of FIG. 4 for a case where the retention period of the file on the non-FLR secondary is set by class.

Consider a second case of migration of a non-FLR file on the primary network file server to a non-FLR secondary network file server. As shown in FIG. 7, in this case the normal file on the primary network file server is migrated to the non-FLR secondary network file server and the policy and migration software migration job defines that it be associated with a retention class when it lands on the secondary storage. Again, in step 121, the connection to the non-FLR secondary file server is marked as supporting retention protection coordination, and in step 122 the primary migrates the file to the secondary storage. However, the primary network file server does not cache the file's retention period in the inode of the corresponding stub file because the retention period is set by class and therefore it might be reduced. In step 123, a client or user requests an action that would change the migrated file (write, delete, move, etc.). In response, in step 124, the primary file server finds that the file's inode is a stub file, so the primary file server checks its connection database to determine whether the connection associated with the stub file supports retention protection coordination, and finds that it supports non-FLR retention protection coordination. In step 125, the primary file server accesses the corresponding stub file inode to see if it includes a file-specific retention period in the "atime" attribute. In step 126, since no file-specific retention period is found in the corresponding stub file inode, the primary network file server queries the non-FLR secondary file server and caches the fact that the file is protected for only a short period of time (certainly less that the outstanding retention period as reported by the non-FLR secondary file server) in the stub file inode. In this example, the primary network file server cannot cache the retention period for the duration of its reported length because being derived from a class defined on the non-FLR secondary file server it can be reduced by a system administrator having access rights to the non-FLR secondary file server. Finally, in step 127, the primary network file server grants or denies the client or user request as appropriate for the file's retention period and the kind of user request, as described above with reference to steps 75 to 79 in FIG. 3.

As shown in FIG. 4, it also would be possible to provide the primary network file server 26 with a cache 89 of the retention classes and corresponding retention times that are used in the non-FLR secondary file server 28. By keeping this local cache 89 coherent with any changes to the class retention times that are used in the non-FLR secondary network file server, it would be possible to eliminate a need for the primary network file server 26 to query the non-FLR secondary network file server 28 for the retention period of a file when that retention period is set by class. In this case, the stub file could be provided with a retention class name that would be set when the file is migrated from the primary network file server 26 to the non-FLR secondary network file server. (For example, step 122 of FIG. 7 could be changed to set the file's retention class name in the inode of the corresponding stub file.) When an authorized user or system administrator would change the retention period for a particular class, this change would be made in both the non-FLR secondary network file server 28 and in the local cache 89 in the primary network file server 26, without a need to change this retention period in any stub file in the primary network file server.

Figure 8:
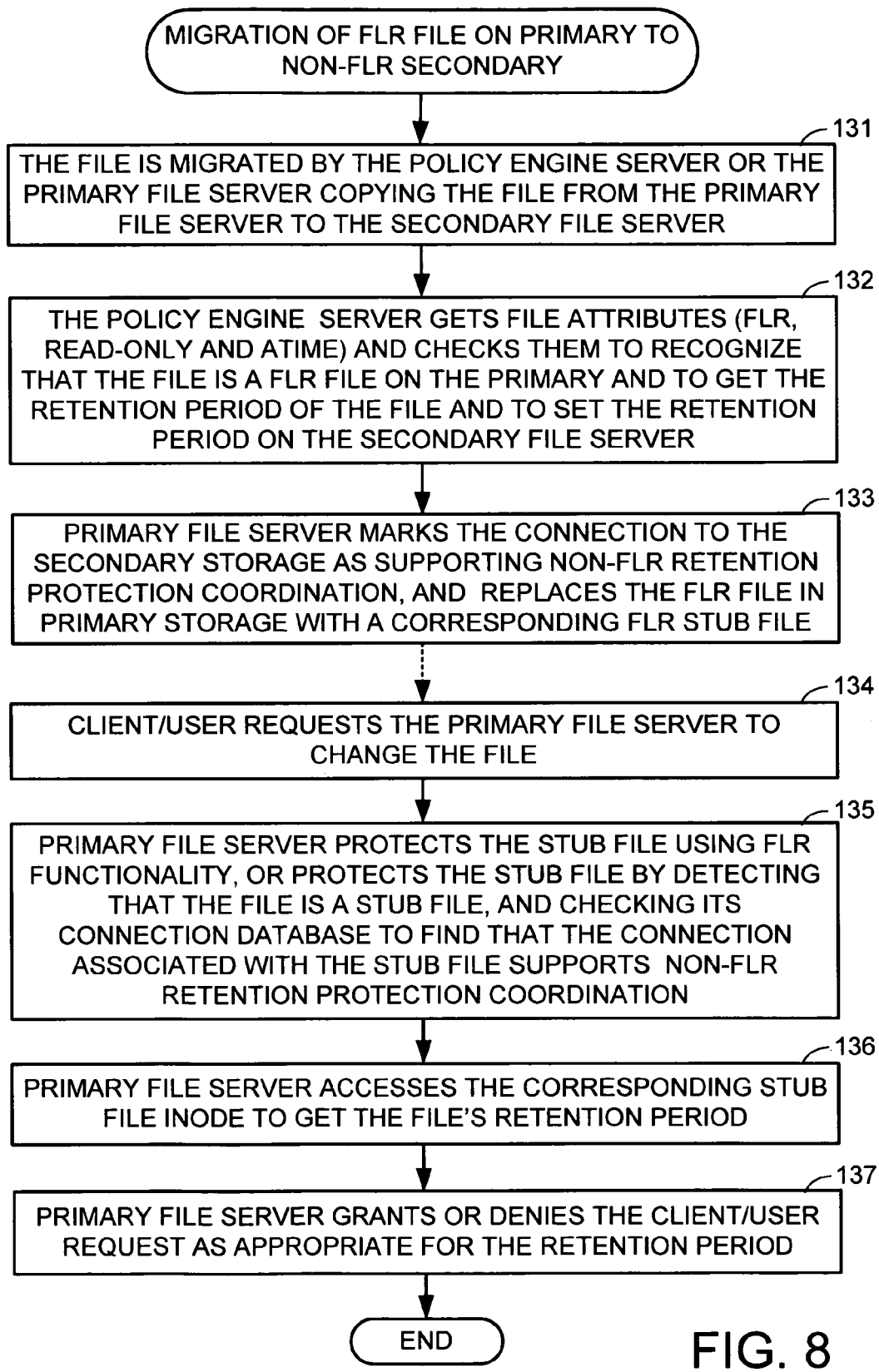
FIG. 8 is a flowchart showing migration of a FLR file on the primary network file server to the non-FLR secondary network file server in the data network of FIG. 4.

Consider next the case of migration of a FLR file on the primary file server to a non-FLR secondary file server. As shown in FIG. 8, in a first step 131, the FLR file on the primary file server is migrated to the non-FLR secondary file server by the policy engine server or the primary file server copying the file from the primary file server to the non-FLR secondary file server. In step 132, the policy engine server gets the file attributes (FLR attribute, read-only attribute and "atime") from the primary network file server and checks the file attributes in order to recognize that the file is in a FLR state. These file attributes are translated into a retention period for the migrated file, and this retention period for the migrated file is set on the non-FLR secondary file server. In step 133, the primary network file server marks the connection to the secondary storage as supporting non-FLR retention protection coordination, and replaces the FLR file in primary storage with a corresponding FLR stub file. In step 134, the client or user requests an action that would change the migrated file (e.g., write, delete, move, etc.). In step 135 the primary network file server can respond by using the FLR functionality of the primary network file server to protect the file. There is no need for the primary network file server to check with the non-FLR secondary network file server because the protection is defined by the client or user via the primary file system. The primary network file server could also protect the FLR stub file using steps similar to protecting a stub file for which a file-specific retention period is cached in the stub file's inode. Thus, the primary file server could find that the file's inode is a stub file, check its connection database to determine whether the connection associated with the stub file supports retention protection coordination, and find that it supports non-FLR retention protection coordination. In step 136, the primary file server accesses the corresponding stub file inode to get the file's retention period. In step 137, the primary file server grants or denies the client or user request as appropriate for the retention period and the kind of client request, as described above with reference to steps 75 to 79 in FIG. 3.

Consider the case where a FLR file on the primary network file server is migrated to the non-FLR secondary file server using "write-out" functionality, that is, the primary network file server does the copy of the file to the non-FLR secondary file server. The primary network file server writes the file to the non-FLR secondary file server via HTTP and the non-FLR secondary file server sets the retention period (as outline above) and the primary network file server sets the file offline. Again, in response to a request from a client or user, access to the file is controlled by the FLR functionality on the primary network file server without reference to the non-FLR secondary file server. If a client or user extends the retention period on a FLR file that has been migrated to a non-FLR secondary file server, then the primary network file server will detect that the stub file references a connection that has the retention protection coordination option enabled and send an appropriate HTTP message to the non-FLR secondary file server to extend the retention period of the file on the non-FLR secondary file server.

Figure 9:
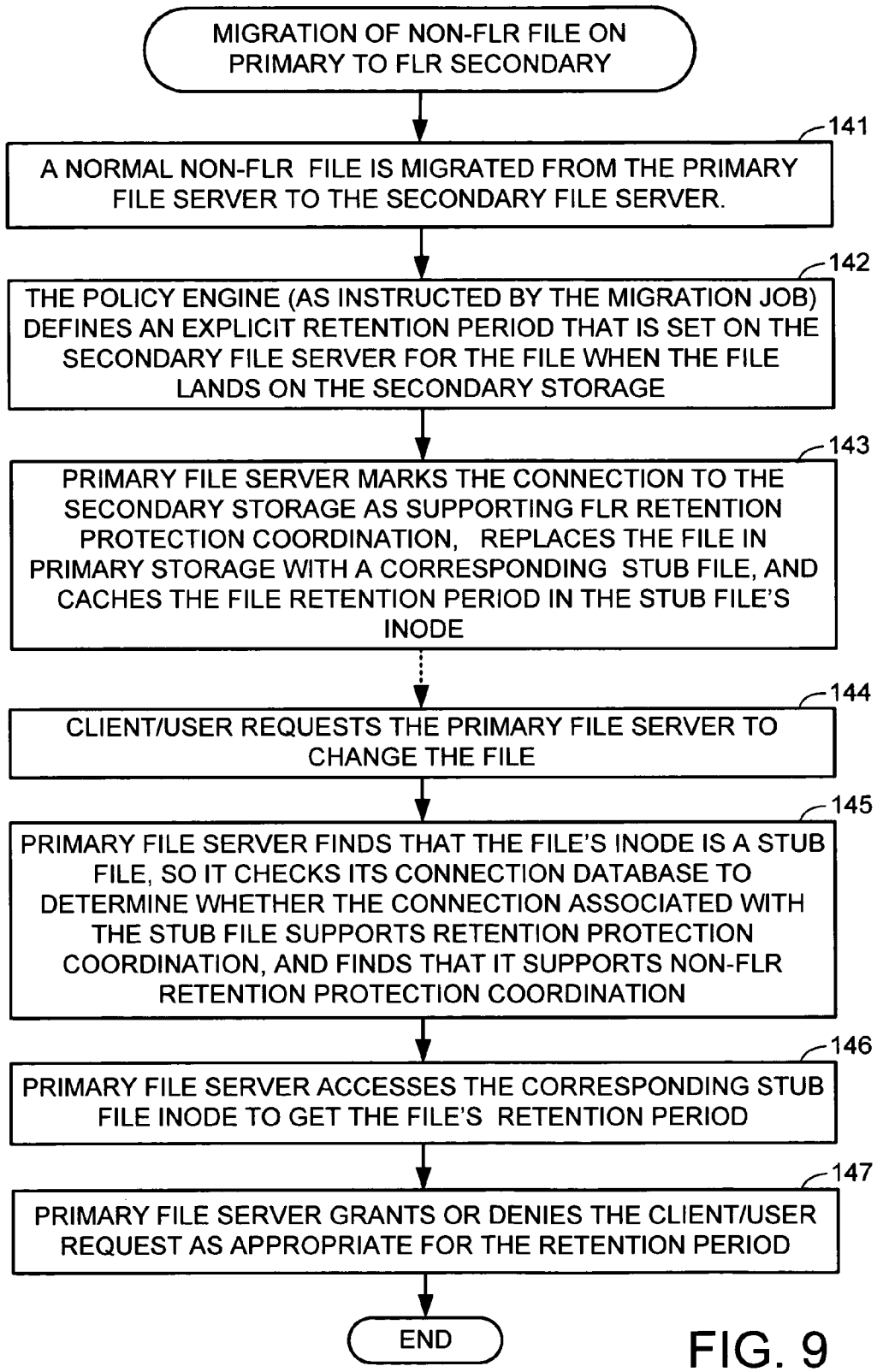
FIG. 9 is a flowchart showing migration of a non-FLR file on the primary network file server to the FLR secondary network file server in the data network of FIG. 4.

Consider the case where a non-FLR file in the primary network file server is migrated to a FLR secondary file server. As shown in FIG. 9, in a first step 141, a normal file in the primary network file server is migrated to a FLR file system on the FLR secondary file server. In step 142, the policy engine server (as instructed by the migration software migration job) defines that an explicit retention period is applied to the file when it lands on the secondary storage. In step 143, the primary network file server marks the connection to the secondary file server as supporting retention protection coordination, replaces the file in primary storage with a corresponding stub file, and caches the file retention period in the stub file's inode. It also does not matter whether the migration is done by the primary network file server writing out the file to the secondary file server since the primary network file server is not trying to apply any retention protection. In step 144, a client or user requests an action that would change the migrated file (e.g., write, delete, move, etc.). In step 145, in response to the client or user request, the primary network file server finds that the file's inode is a stub file, so it checks its connection database to determine whether the connection associated with the stub file supports retention protection coordination, and finds that the file has been migrated to a FLR secondary via a connection that has the retention protection coordination option enabled. Therefore, in step 146, the primary file server accesses the corresponding stub file to get the file's retention period. If the primary network file server does not have a cached retention period for the file it will query the read-only status and "atime" of the file on the secondary file server and cache that value in the stub file inode. The primary network file server then does not need to query the secondary file server again until the file's cached retention period has expired to see if the retention period has been extended on the secondary since the primary network file server last checked. In step 147, the primary file server grants or denies the client or user request as appropriate for the retention period and the kind of request, as described above with reference to steps 75 to 79 in FIG. 3.

Figure 10:
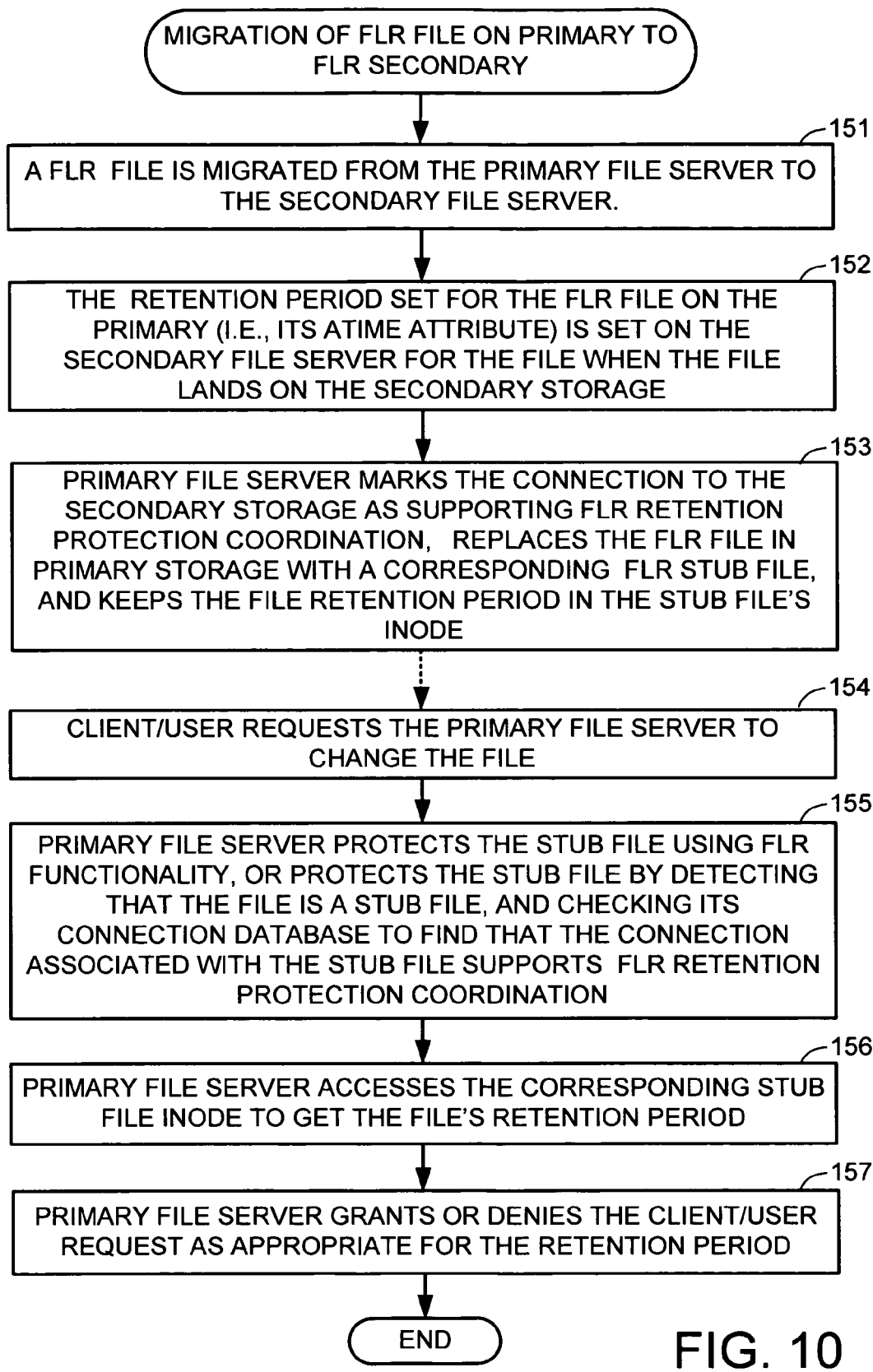
FIG. 10 is a flowchart showing migration of a FLR file on the primary network file server to the FLR secondary network file server in the data network of FIG. 4.

FIG. 10 shows the case where a FLR file on the primary network file server is migrated (in a first step 151) to a FLR file system on the secondary network file server. In step 152, the retention period set for the FLR file on the primary (i.e., its "atime" attribute) is set on the secondary file server for the file when the file lands on the secondary storage. For example, to do this either: (1) the policy engine server (as instructed by the policy and migration application) recognizes that the file is in the FLR state (FLR attributes returned in response to "GET_ATTRIBUTES" or "GET_BULK_ATTRIBUTES" calls) and replicates that on the secondary FLR file system; or (2) the policy engine server (as instructed by the policy and migration application) will just migrate the file as normal and the primary network file server will set the retention period on the file by setting the "atime" and read-only status via CIFS or NFS as part of converting the original file into a stub file in the following step 153. The second alternative should be easier because the primary network file server has control and even if the policy and migration application resets the retention period the primary network file server setting it as well will not hurt. In step 153, the primary network file server marks the connection to the secondary storage as supporting FLR retention protection coordination, replaces the FLR file in primary storage with a corresponding FLR stub file, and keeps the file retention period in the stub file's inode. In step 154, a client or user requests an action that would change the migrated file (e.g., write, delete, move, etc.). In step 155 the primary network file server can use the normal FLR functionality to protect the file, or the primary network file server can protect the stub file by detecting that the file is a stub file, and checking its connection database to find that the connection associated with the stub file supports FLR retention protection coordination. There is no need to check with the secondary network file server because the protection is defined by the client or user via the primary file system. In step 156, the primary network file server accesses the corresponding stub file to get the file's retention period. In step 157, the primary file server grants or denies the client or user request as appropriate for the file's retention period and the kind of request, as described above with reference to steps 75 to 79 in FIG. 3.

If a client or user extends the retention period on a FLR file that has been migrated to a FLR file system on the secondary network file server, then the primary network file server will detect that the stub file references a connection that has the retention protection coordination option enabled and use CIFS or NFS to modify the "atime" of the file on the secondary FLR file system.

Regardless of type of secondary storage, a migrated file that is still under retention on the secondary network file server can be read by a client and the read recall policy in effect is either full or partial. The file should be recalled to the primary network file server as normal and the retention period in effect on the secondary translated into FLR style protection on the non-FLR secondary file server. This will translate class based protection on the secondary network file server into FLR based protection on the primary network file server. Nothing will happen if the protection is extended on the secondary.

If an attempt is made to migrate a file that was set to FLR status on the primary file system to a secondary that is not marked as supporting retention period protection coordination, then a "set offline" call will fail.

Figure 11:
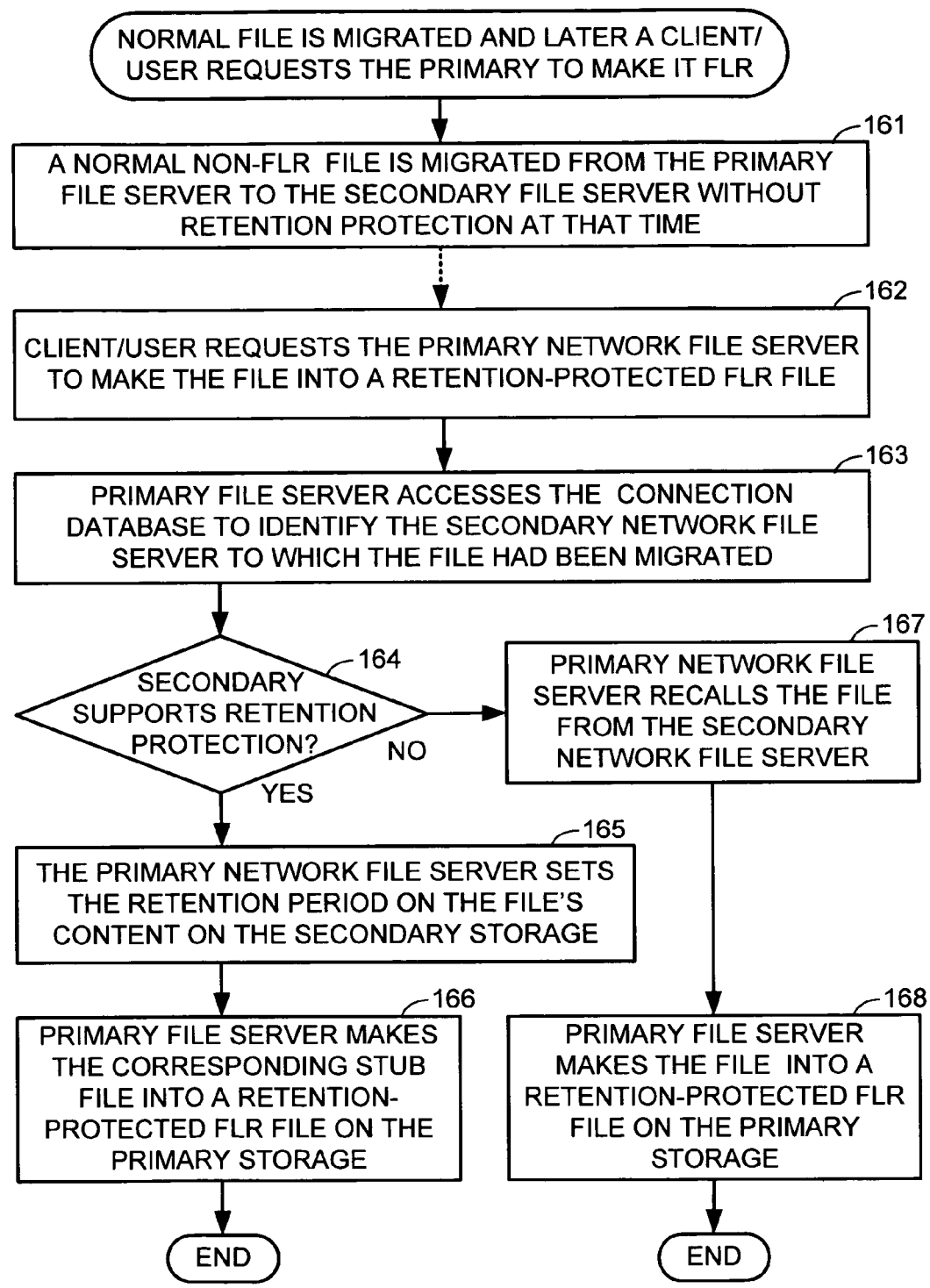
FIG. 11 is a flowchart showing how the data network of FIG. 4 handles a client or user request to make a normal file FLR after the normal file has been migrated to a secondary file server without retention protection at that time.

As shown in FIG. 11, in a first step 161, a normal file can be migrated from the primary network file server to the secondary network file server without retention protection at that time. Later, in step 162, a client or user may request the primary network file server to make the file into a retention-protected FLR file. In response to the request, in step 163, the primary network file server accesses its connection database to identify the secondary network file server to which the file had been migrated. In step 164, if the secondary network file server that the file has been migrated to does support retention period coordination, then execution continues to step 165. In step 165, the primary network file server sets the retention period on the file's content on the secondary storage. If the file's content is already protected by a retention period on secondary that is longer than that requested, then the request from the primary network file server to the secondary network file server will have no effect, but that is not a problem. In step 166, the primary file server makes the corresponding stub file into a retention-protected FLR file on the primary storage, and the procedure is finished.

If in step 164 the secondary network file server to which the file has been migrated does not support retention period coordination or if there is an error in setting the retention time on the file's content on the secondary network file server, then execution branches to step 167. In step 167, the primary network file server recalls the file from the secondary network file server. Then in step 168, the primary file server makes the file into a retention-protected FLR file on the primary storage, and the procedure is finished.

In view of the above, there has been described various ways of migrating FLR and non-FLR files from primary storage to FLR and non-FLR retention protected secondary storage and retaining a corresponding stub file in the primary storage in order to facilitate access to the migrated file data. This enables automatic policy-based archiving or migration of data to both FLR and non-FLR retention protected secondary storage from diverse applications accessing FLR or non-FLR files in the primary storage.

In the preferred implementation, this flexibility in the hierarchical storage system is made possible by providing the non-FLR secondary network file server with a facility to receive and respond to requests from the primary network file server for both querying and setting the retention period on files as outlined above. Also, when migrating a file from the primary network file server to the secondary network file server, a policy engine may recognize that the primary file is in the FLR state (by requesting and obtaining file attributes from the primary network file server, translating that into a retention period, and setting that retention period on the non-FLR secondary network file server). The primary network file server keeps a record, in its connection database, of whether connections to the secondary network file servers support retention protection and coordination, and if so, the level or kind of such support (e.g., FLR or non-FLR secondary, and whether or not protection by class is supported). The primary network file server caches retention periods obtained from the secondary network file server either long term when the retention period cannot be reduced on the secondary network file server or short term in the case where the retention period can be reduced on the secondary network file server. The primary network file server allows FLR style protection to be applied to a file in a file system that was not initially created as a FLR file system, for example, for protecting a corresponding stub file for a non-FLR file that has been migrated to retention protected secondary storage.

What is claimed is:

1. A computer-implemented method of operating a primary file server and a secondary file server in a data network, said method comprising:
the primary file server replacing a specified file in primary storage of the primary file server with a corresponding stub file in the primary storage when data of the specified file are migrated from the primary storage to secondary storage of the secondary file server, the corresponding stub file retaining attributes of the specified file including an indication of a location of the file data in the secondary storage;
wherein the method further includes the secondary file server setting a retention period for the file data in the secondary storage, and the secondary file server retaining the file data in the secondary storage for the retention period; and
wherein the primary file server sets at least one attribute of the corresponding stub file to indicate that the corresponding stub file is to be retained for the retention period, and the primary file server accesses said at least one attribute of the corresponding stub file to reject a request from a client or user to change the specified file prior to expiration of the retention period.

2. The computer-implemented method as claimed in claim 1, which further includes the primary file server setting an attribute of the corresponding stub file to indicate the retention period of the corresponding stub file.

3. The computer-implemented method as claimed in claim 1, wherein the retention period of the file data is set by class on the secondary file server, the method includes the primary file server responding to the request from the client or user to change the specified file by obtaining the retention period of the file data from the secondary file server.

4. The computer-implemented method as claimed in claim 1, which includes a system administrator instructing the primary file server that the secondary file server supports retention based protection and it is desired to protect stub files corresponding to protected files that are migrated to the secondary file server.

5. The computer-implemented method as claimed in claim 1, which includes the primary file server requesting the secondary file server to return a protection status of the specified file after the data of the specified file have been migrated to the secondary file server, and the secondary file server returning the protection status of the specified file including an indication of whether the specified file is protected or not, and when protected a retention period of the specified file and an indication of whether the retention period can be reduced.

6. The computer-implemented method as claimed in claim 1, wherein the primary file server includes a connection database, and the corresponding stub file indicates a connection in the connection database for accessing the secondary file server, and the method includes storing in the connection database information specifying a file retention protection technique used by the secondary file server.

7. The computer-implemented method as claimed in claim 1, which includes the primary file sever protecting the corresponding stub file by detecting that the request from the user is a request to access a specified file that has been replaced with a corresponding stub file, the corresponding stub file indicating a connection to the secondary file server, and the primary file server accessing a connection database to find that the secondary file server supports retention protection for the specified file over the connection indicated by the corresponding stub file.

8. The computer-implemented method as claimed in claim 1, wherein the corresponding stub file is in a file level retention (FLR) protected file system in the primary storage, and the method includes the primary file server protecting the corresponding stub file by applying FLR functionality.

9. The computer-implemented method as claimed in claim 1, wherein the specified file is not retention protected when the file data are migrated from the primary file server to the secondary file server and the specified file in the primary storage is replaced with the corresponding stub file in the primary storage, and thereafter the primary file server receives a client or user request to put retention protection upon the specified file, and the primary file server responds by setting the retention period upon the file data in the secondary file server, and by setting the retention period upon the corresponding stub file.

10. The computer-implemented method as claimed in claim 1, wherein the primary file server responds to a client or user request for retention protection of the specified file by checking whether data of the specified file have been migrated, and upon finding that data of the specified file have been migrated, checking whether retention protection is supported upon the data of the specified file that have been migrated, and upon finding that retention protection is not supported upon the data of the specified file that have been migrated, recalling to the primary file server the data of the specified file that have been migrated, and setting retention protection upon the specified file in the primary file server.

11. A primary file server for use in a data network coupling the primary file server to at least one secondary file server, the primary file server comprising primary storage and being programmed for replacing a specified file in the primary storage with a corresponding stub file in the primary storage when data of the specified file are migrated from the primary storage to secondary storage of the secondary file server, the corresponding stub file storing attributes of the specified file including an indication of a location of the file data in the secondary storage;
wherein the primary file server is programmed for setting at least one attribute of the corresponding stub file to indicate that the corresponding stub file is to be retained for a retention period when the secondary file server supports retention protection of the migrated file data and the secondary file server has been set to retain the migrated file data for the retention period, and the primary file server is programmed for accessing said at least one attribute of the corresponding stub file to reject a request from a client or user to change the specified file prior to expiration of the retention period.

12. The primary file server as claimed in claim 11, wherein the primary file server is programmed for setting an attribute of the corresponding stub file to indicate the retention period of the corresponding stub file.

13. The primary file server as claimed in claim 11, wherein the retention period of the specified file is set by class on the secondary file server, and the primary file server is programmed for responding to the request from the client or user to change the specified file by obtaining the retention period of the specified file from the secondary file server.

14. The primary file server as claimed in claim 11, which is programmed to respond to a request from a system administrator instructing the primary file server that the secondary file server supports retention based protection and it is desired to protect stub files corresponding to protected files that are migrated to the secondary file server.

15. The primary file server as claimed in claim 11, which further includes a connection database, and the corresponding stub file indicates a connection in the connection database for accessing the secondary file server, and the connection database contains information specifying a file retention protection technique used by the secondary file server.

16. The primary file server as claimed in claim 11, which is programmed for protecting the corresponding stub file by detecting that the request from the user is a request to access a specified file that has been replaced with a corresponding stub file, the corresponding stub file indicates a connection to the secondary file server, and the primary file server is programmed for accessing a connection database to find that the secondary file server supports retention protection for the specified file over the connection indicated by the corresponding stub file.

17. The primary file server as claimed in claim 11, wherein the corresponding stub file is in a file level retention (FLR) protected file system in the primary storage, and the primary file server is programmed for protecting the corresponding stub file by applying FLR functionality.

18. The primary file server as claimed in claim 11, which is programmed to respond to a client or user request for retention protection of the specified file by checking whether data of the specified file have been migrated, and upon finding that data of the specified file have been migrated, checking whether retention protection is supported upon the data of the specified file that have been migrated, and upon finding that retention protection is not supported upon the data of the specified file that have been migrated, recalling to the primary file server the data of the specified file that have been migrated, and setting retention protection upon the specified file in the primary file server.

19. A system comprising a primary file server, a file level retention (FLR) secondary file server, a non-FLR write once read many (WORM) secondary file server, and a data network interconnecting the primary file server to the FLR secondary file server and the WORM secondary file server for migration of file data from the primary file server to the FLR secondary file server and from the primary file server to the WORM secondary file server, wherein the primary file server is programmed for migrating data of FLR files and data of non-FLR files to the FLR secondary file server, and for migrating data of FLR files and data of non-FLR files to the WORM secondary file server,
wherein the primary file server is programmed for replacing a specified file in the primary file server with a corresponding stub file in the primary file server when data of the specified file have been migrated from the primary file server to a selected one of the FLR secondary file server and the WORM secondary file server, the corresponding stub file containing attributes of the specified file including an indication of a location of the data of the specified file in the selected one of the FLR secondary file server and the WORM secondary file server; and
wherein the primary file server is programmed for setting at least one attribute of the corresponding stub file to indicate that the corresponding stub file is to be retained for a retention period of the data of the specified file on the selected one of the FLR secondary file server and the WORM secondary file server, and the primary file server is programmed for accessing said at least one attribute of the corresponding stub file to reject a request from a client or user to change the specified file prior to expiration of the retention period.

20. The system as claimed in claim 19, wherein the specified file is not retention protected when data of the specified file are migrated from the primary file server to the selected one of the FLR secondary file server and the WORM secondary file server and the specified file in the primary file server is replaced with the corresponding stub file in the primary file server, and the primary file server is programmed for thereafter receiving a client or user request to put retention protection upon the specified file, and the primary file server is programmed to respond to the client or user request to put retention protection upon the specified file by setting the retention period upon the data of the specified file in the selected one of the FIR secondary file server and the WORM secondary file server, and by setting the retention period upon the corresponding stub file.

* * * * *